United States Patent [19]
Albaric et al.

[11] 4,114,059
[45] Sep. 12, 1978

[54] GROOVED VISCO SEAL FOR STATIONARY DISCHARGE CHAMBER OF WATER-COOLED TURBINE GENERATOR

[75] Inventors: Jacques E. Albaric; Little P. Curtis, both of Monroeville; George F. Dailey, Pittsburgh, all of Pa.

[73] Assignee: Westinghouse Electric Corp., Pittsburgh, Pa.

[21] Appl. No.: 720,332

[22] Filed: Sep. 3, 1976

[51] Int. Cl.² ............................................. H02K 9/00
[52] U.S. Cl. ...................................... 310/54; 310/61; 277/3; 277/59
[58] Field of Search ............... 310/54, 61, 57, 52, 310/58, 59, 60, 64, 65, 85; 277/3, 59, 28, 134; 290/52

[56] References Cited
U.S. PATENT DOCUMENTS 3,733,501  5/1973  Heller .................................... 310/54
3,831,046  8/1974  Curtis .................................... 310/54
3,963,247  6/1976  Nommensen ........................ 277/59
3,968,388  7/1976  Lambrecht ........................... 310/54
4,010,960  3/1977  Martin .................................. 277/59
4,018,059  4/1977  Hatch .................................. 310/61

*Primary Examiner*—R. Skudy
*Attorney, Agent, or Firm*—G. H. Telfer

[57] ABSTRACT

A discharge chamber seal arrangement for a water cooled turbine generator rotor. The discharge chamber seal arrangement comprises a gland seal operable during high speed operation of the rotor and a contact seal operable during low rotor speed and at standstill. Helical grooves located on the inside diameter of the gland seal develops an axial pressure gradient in the fluid annulus surrounding the shaft to reduce the leakage flow at speed through the gland seal. The helical grooves apply a pumping action which opposes the leakage flow.

2 Claims, 7 Drawing Figures

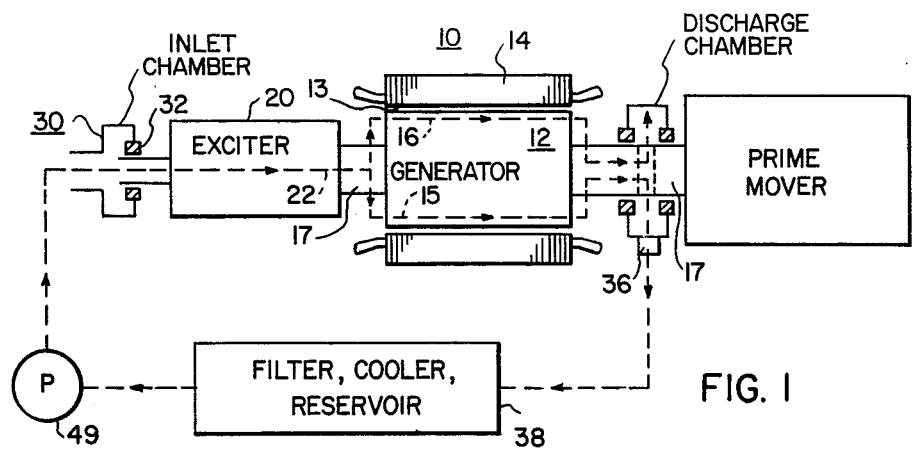
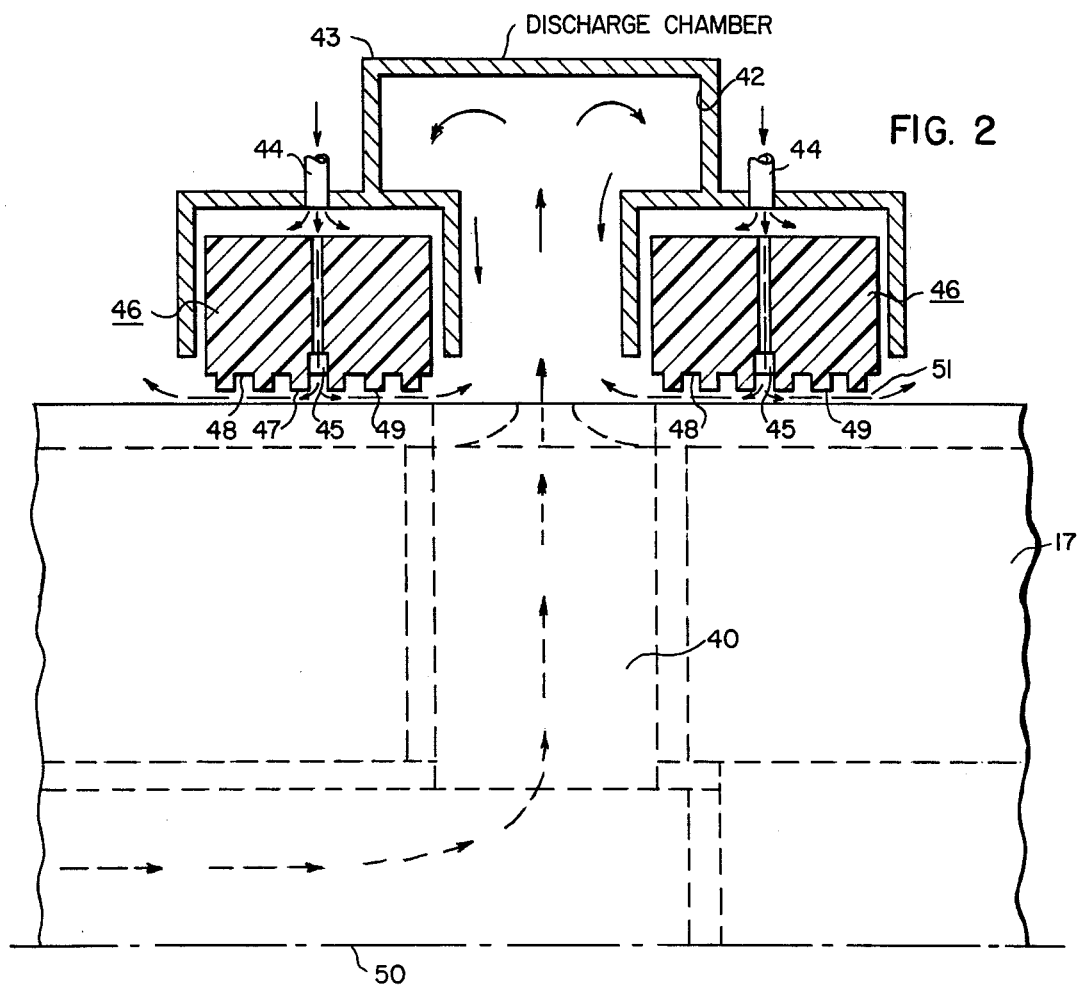

GROOVED VISCO SEAL FOR STATIONARY DISCHARGE CHAMBER OF WATER-COOLED TURBINE GENERATOR

BACKGROUND OF THE INVENTION

1. Field of the Invention

This invention relates to dynamoelectric machines having a water-cooled rotor, and in particular, to a seal arrangement for a discharge chamber of such a rotor.

2. DESCRIPTION OF THE PRIOR ART

Large turbine generators are usually of the inner-cooled or direct cooled construction in which a coolant fluid is circulated through duct means in the stator and rotor slots in direct thermal contact with the current carrying conductors inside ground insulation. This type of construction provides an effective cooling system and has made it possible to greatly increase the maximum rating obtainable in large generators without exceeding the permissible limits of physical size. The coolant used in these machines has usually been hydrogen, which fills the gas-tight housing and is circulated by a blower on the rotor shaft through the ducts of the stator and rotor windings and through ducts in the stator core.

The maximum ratings required in large generators have continued to increase, making it necessary to further improve the cooling of these machines in the larger sizes. A substantial improvement in cooling can be obtained by the use of a more efficient cooling fluid, such as water. This has been done in stators by circulating water tight the ducts of the stator winding. A further improvement can be obtained by applying a liquid coolant such as water to the rotor by circulation of the water through passages and the rotor windings.

Many problems are involved, however, in circulating a liquid coolant through the passages of the rotor of a large generator rotating at a high speed, usually 3600 revolutions per minute (in the U.S.). One of the most difficult problems is that of introducing the liquid into the rotor and discharging it therefrom. The liquid is preferably introduced along the axis of the shaft where the centrifugal force on the liquid is at a minimum, and is discharged through radial passages into the rotor shafts. A relatively large volume of liquid must be introduced into the rotor under sufficient pressure to maintain the desired flow rate to the rotor, and the same liquid is discharged from the rotor at high velocity and under high pressure into a stationary cooling discharge chamber from which it is drained. It is apparent that in a liquid cooled rotor suitable seals must be provided at the discharge passages. However, the provision of such seals for the discharge chamber poses a difficult problem because of the high velocity of the liquid, the pressures involved, and especially the large diameter of the rotor when the discharge chamber is located between the generator and the turbine.

Conventional seals for rotating shafts have serious disadvantages when applied to a discharge passage of a large dynamoelectric machine shaft rotating at high speeds. Labyrinth seals are well known in the art; however, because of the large clearances required between the seal housing and the rotating shaft, labyrinth seals are ineffective for liquids having a low viscosity, such as water, which results in an excessively large leakage flow through the seal, especially at large diameters.

Friction or face-type seals are also well known in the art. These seals, however, are impractical for sealing the discharge chambers of a liquid cooled rotor at the high rubbing velocities involved, which may be in excess of 20,000 feet per minute. Such rubbing velocities result in a very rapid wear with excessive heating due to friction loss, and are thus inappropriate for use to seal the discharge chambers of the liquid cooled rotors during high speed operation.

Fluid film gland seals using stationary seal rings are more suitable for the discharge chamber of the rotor during operation under the difficult conditions involved at high speeds. The known single flow type of circumferential ring seal, however, would allow excessive leakage of liquid through the clearance space between the seal rings and the shaft because of low viscosity of water. Since the coolant liquid must be decontaminated and must be treated to keep the oxygen content at a level that does not cause corrosion in the interior of the rotor windings, the leakage and subsequent loss of large amounts of coolant water is undesirable. The loss of this treated water would require that a large amount of treated make-up water be provided, requiring a larger water circulation system and an increased amount of expensive treatment equipment which would increase the manufacturing and operation costs. Leakage of the treated coolant must therefore be minimized.

The prior art provides a fluid film gland seal that utilizes a stationary seal ring encircling the shaft adjacent the coolant discharge chamber with a small clearance. In order to minimize leakage of the coolant liquid out of the discharge chamber through this clearance, a sealing liquid is introduced into the clearance between the ring and shaft. The sealing liquid is maintained at a pressure not exceeding the pressure of the coolant liquid in the discharge chamber. A small amount of the coolant liquid may therefore escape through the clearance around the shaft, but the amount of coolant liquid escaping is minimized and contamination of the coolant liquid by the sealing liquid is prevented. Several chambers having predetermined pressures therein are provided adjacent to the seal ring to prevent the liquid from escaping from the atmospheric chamber. In this way a very efficient seal is provided for a large volume of liquid with a high velocity and pressure. U.S. Pat. No. 3,733,501, issued to P. R. Heller, and assigned assignee of the present invention, discloses an example of the prior art using a gland seal of this type.

An even more efficient gland seal for sealing the discharge chamber of a water cooled rotor is that disclosed and claimed in U.S. Pat. No. 3,831,046, issued to L. P. Curtis et al., and assigned to the assignee of the present invention. This seal disposes the gaseous fluid within the discharge chamber in order to minimize fluid friction losses between the rotor surface and the discharge coolant liquid in the seal chamber. In order to prevent contamination of the coolant liquid, a stationary seal ring is provided in an annular chamber adjacent the discharge chamber. The seal ring encircles the shaft with a small predetermined clearance. In order to minimize leakage of the coolant liquid through the clearance space between the seal ring and the rotor shaft, a first sealing liquid is introduced through an opening in the seal ring into the clearance space between the ring and the shaft. This first sealing liquid is maintained at a predetermined pressure and is itself specially treated before use in the apparatus. A second sealing liquid is introduced through a separate opening in the sealing ring into the clearance between the sealing ring and the shaft. The second sealing fluid is maintained at a pressure not exceeding the pressure of the first sealing liquid. The first sealing liquid is disposed so as to be interposed between the partially filled coolant discharge and the second sealing liquid. Small amounts of the first sealing liquid may escape through the clearance space around the shaft into the coolant discharge chamber, but intermingling of the coolant liquid with the first sealing liquid would not be disadvantageous, since the first sealing liquid is treated in a manner similar to the coolant liquid.

However, since the first sealing liquid of the prior art gland seal described above is at a slightly higher pressure than the second sealing liquid, disposing the first sealing liquid between the coolant liquid and the second sealing liquid prevents the intermingling and the contamination of the coolant liquid by the second sealing liquid. Several chambers having predetermined pressures therein are provided to prevent the escape of liquid along the shaft. In this way a very effective seal is provided for handling large volumes of liquid coolant at high pressures and velocities. The seal increases the efficiency of the apparatus and prevents cavitation at the surface of the rotor.

Although the fluid film gland seals described above are efficient at the high operating velocities of the rotor, such seals are not as efficient at low rotating speeds or a standstill. Since for practical purposes the rotor must be kept filled with water at all times and also the discharge chamber is required to be isolated from the atmosphere, sealing liquid flow in these prior art seals must be maintained at all times. Consequently, at low speeds or at standstill where friction losses are small, large amounts of the specially treated sealing liquid may leak away from the sealing arrangement. This leakage is significant because it is the amount of the maximum sealing liquid flow, which is the flow at standstill, which determines the size and volume requirements of the sealing liquid feeding system. As stated earlier, contact seals are inefficient for use at high operational velocities due to excessive friction and rubbing wear which occur at these velocities. However, at low rotational velocities or at standstill, a contact seal is highly efficient.

Therefore, to minimize the maximum sealing fluid leakage flow through a large diameter fluid film gland seal and to minimize the size of the heating system of that seal, the sealing at standstill and at low speeds is improved by the incorporation of contact seals which are most efficient at standstill and at low rotational speeds. Such an arrangement is disclosed and claimed in the copending application of J. E. Albaric, Ser. No. 720,331, filed on 9/3/1976, and assigned to the assignee of the present invention. In that disclosure, a fluid film gland seal is provided to efficiently seal the discharge chamber during high rotational operation of the rotor, while a contact seal is provided to efficiently seal the discharge chamber at low rotating speeds and at standstill. Suitable control means for activating and deactivating the contact seal when the rotor speed reaches predetermined threshold values is also provided. In that disclosure, the contact seal is a segmented seal ring which is applied in response to the control means to insure sealing of the discharge chamber when the rotor speed reaches the predetermined threshold value.

Once the sealing at standstill and low speed is effectively taken care of, further reduction in the maximum rate of flow leakage through the seals with a reduction in the size of the system that circulates the lubricating water can only come from improvement of the sealing system effectiveness at operating speed.

SUMMARY OF THE INVENTION

An object of this invention is to provide a seal arrangement for the discharge chamber of a water-cooled turbine generator rotor which provides efficient sealing throughout the entire range of operating speeds of the rotor, and in particular, it is an object to provide a seal arrangement for the discharge chamber that provides improved sealing at high rotor speeds.

It has been experimentally determined that one way to reduce the leakage flow, at speed, through a clearance gland seal in to construct threaded grooves on a portion of the seal length to apply "pumping" action opposed to the leakage flow. Such seals with threaded grooves will hereinafter be referred to as "visco seals".

The visco seal of the present invention is disclosed in combination with a contact seal in a sealing arrangement for the discharge chamber of a large water-cooled turbine generator rotor. A fluid film gland seal (visco seal) having grooved bearing portions is provided to efficiently seal the discharge chamber during high rotational operation of the rotor, while a contact seal is provided to efficiently seal the discharge chamber at low rotating speeds and at standstill. The grooves in the visco seal develop an axial pressure gradient in the fluid annulus surrounding the rotor shaft to oppose the leakage flow. Such a seal arrangement may be characterized as a visco pump operating at shutoff head. Due to the self-pressurizing effect of the grooving, the helical grooves can operate without cavitation at high eccentricity ratios without need for a pressurized loop supply.

BRIEF DESCRIPTION OF THE DRAWING

The invention will be more fully understood from the following detailed description of the preferred embodiment, taken in connection with the accompanying drawing, in which:

FIG. 1 is a block diagram of a turbine generator system having a water-cooled stator;

FIG. 2 is an enlarged view of a discharge chamber for the turbine generator of FIG. 1;

DESCRIPTION OF THE PREFERRED EMBODIMENT

Figure 3:
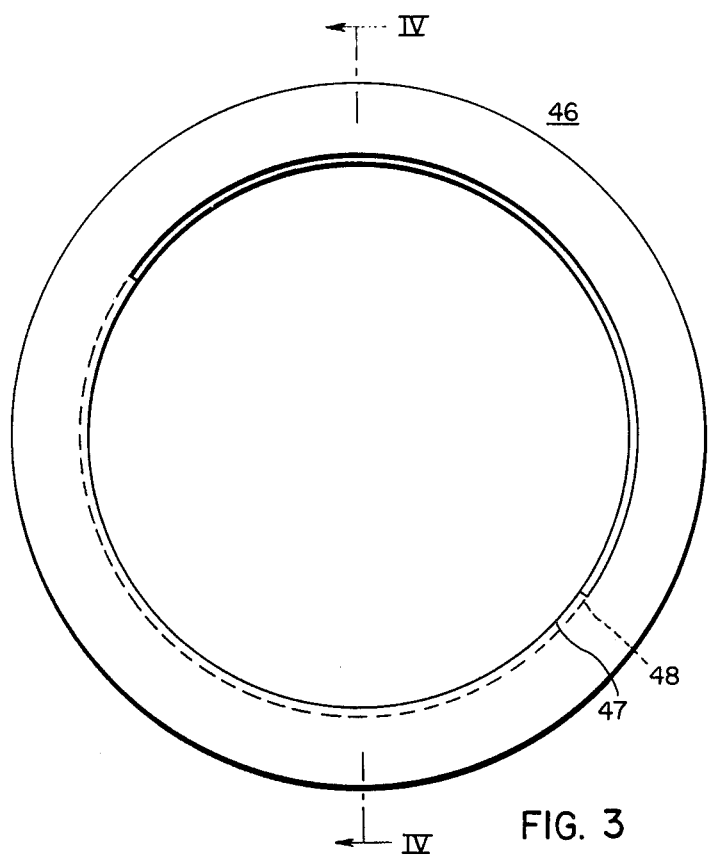
FIG. 3 is an elevational view of a grooved visco seal constructed according to the teachings of the present invention.

Referring to FIG. 1 of the drawing, the invention is shown embodied in a water-cooled rotor of a large turbine generator apparatus, although it will be understood that the sealing means of the present invention may be utilized in a water-cooled dynamoelectric machine of any desired type or size.

According to FIG. 1, generator 10 has a rotor member 12 which is disposed within a bore 13 of a stator core 14 and is supported in bearings (not shown). The rotor member 12 has a central body portion which is provided with the usual peripheral slots for reception of a rotor winding (not shown). The rotor winding, which constitutes the field winding of the generator, may be arranged in any suitable manner in the slots for the rotor to form the desired number of magnetic poles, usually two or four poles in machines of this type. The rotor windings are preferably fabricated of copper conductors which extend longitudinally through the slots so the rotor body and generally circumferentially in the end turn portions which lie beyond the ends of the rotor body and which are supported against rotational forces by retaining rings. The conductors of the rotor winding are hollow, having central passages extending through them for the flow of coolant liquid from one end of the winding to the other in the manner indicated by the dashed lines 15, 16. Any suitable or desired flow pattern and any desired type of electrical winding connection may be used.

The rotor 12 shown in the FIG. 1 is a liquid cooled rotor of the construction more fully disclosed and claimed in U.S. Pat. No. 3,733,502, issued to L. P. Curtis et al, and assigned to the assignee of the present invention. The rotor 12 has shaft portions 17 extending axially from each end of the body portion and preferably integrally therewith.

An exciter 20 is provided for supplying field excitation to the rotor winding. The exciter 20 may be of any desired type and has a shaft mechanically coupled to the shaft 17 of the rotor 12 to be driven therewith. As more fully described in the last-mentioned Curtis et al patent, the coolant liquid is preferably water and is introduced through the shaft of the exciter 20 into the shaft portions 17 at the left end of the rotor, as seen in FIG. 1. For this purpose, the exciter shaft includes a passage 22 which is coaxial with the rotor shaft 17 and which extends outwardly from the exciter shaft, as shown in the drawings for introduction of water.

Cooling water flows from the passage 22 along the axis of the exciter shaft and is directed into an annular passage in the bore of the rotor 12. The cooling water is then conducted from the annular passage by means of hydraulic connecting means of any suitable type which are connected to individual conductors of the rotor winding. The water flows through the hollow conductors of the rotor winding and is discharged through similar hydraulic connectors to an annular collection chamber on the shaft 17 at the right-hand end of the rotor.

All of the passages and surfaces exposed to the cooling liquid are preferably lined or covered with stainless steel or other corrosion resistant material to prevent corrosion of the rotor by the coolant water. The coolant water is thus introduced to the rotor 12 through the rotating passage 22, and is discharged from the rotor through radial passages. As previously explained, it is necessary to provide the effective seals at both the entrance and discharge points to prevent the escape of the coolant water which flows through the rotor 12 at relatively large volumes and at high velocity and pressure.

At the entrance end, as seen at the left end portion of the rotor 12 of FIG. 1, water is supplied to a stationary pipe and conduit inlet chamber 30. Sealing of the entrance end is provided effectively by a radial flow, fluid film gland seal as disclosed and claimed in U.S. Pat. No. 3,733,501, issued to P. R. Heller et al., and assigned to the assignee of the present invention.

At the discharge end of the rotor, as shown in FIG. 2, the coolant water which passes through the rotor is discharged through the opposed radial passages 40 into a stationary chamber 42 disposed in a discharge housing 43 which encircles the shaft 17 and which encloses the radial passage 44. As more fully explained in U.S. Pat. No. 3,740,596, issued to L. P. Curtis et al., and assigned to the assignee of this invention, each of the radial passages 44 preferably has at its outer end a suitable restrictive orifice 45 therethrough to control the flow of water discharged from the water-cooled rotor 12. The coolant water thus discharged flows into the stationary coolant discharge chamber 42 and is drained therefrom through a suitable drain pipe 36 (FIG. 1). The coolant liquid discharged this way is preferably recycled through a tank or reservoir 38 where it is cooled and treated to remove contamination and recirculated through a pump 49 to the entrance supply pipe 30 where it is again circulated through the rotor 12. The treatment provided for coolant water includes removal of minerals from the water for electrical insulation purposes and removal of oxygen for corrosion prevention purposes.

It is apparent that the discharge chamber 42 must be sealed to prevent loss of this treated coolant fluid. In the earlier mentioned U.S. Pat. No. 3,733,501, issued to P. R. Heller et al., a single, radial-flow fluid film gland seal device utilizing one sealing liquid is utilized to prevent escape of the liquid coolant from the completely filled discharge chamber. In the most recent prior art, as is exemplified by U.S. Pat. No. 3,831,046, a gaseous fluuid, such as hydrogen, is disposed within a partially filled discharge chamber. This arrangement increases overall efficiency of the generator by limiting fluid friction and avoids cavitation which could lead to pitting, and corrosion. In order to reduce the loss of liquid coolant from the discharge chamber of this most recent prior art seal, a double flow, fluid film gland seal may be provided as disclosed and claimed in the copending application of J. E. Albaric, Ser. No. 720,331, filed on 9/3/1976, and assigned to the assignee of the present invention.

Figure 4:
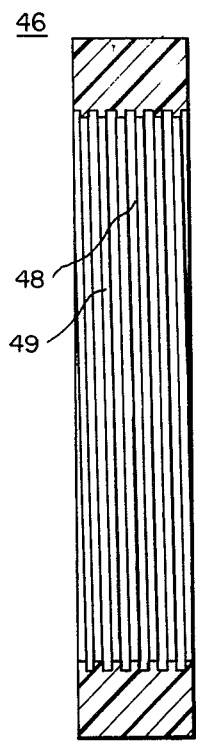
FIG. 4 is a sectional view of the visco seal of FIG. 3 taken along the lines IV—IV.
Figure 5:
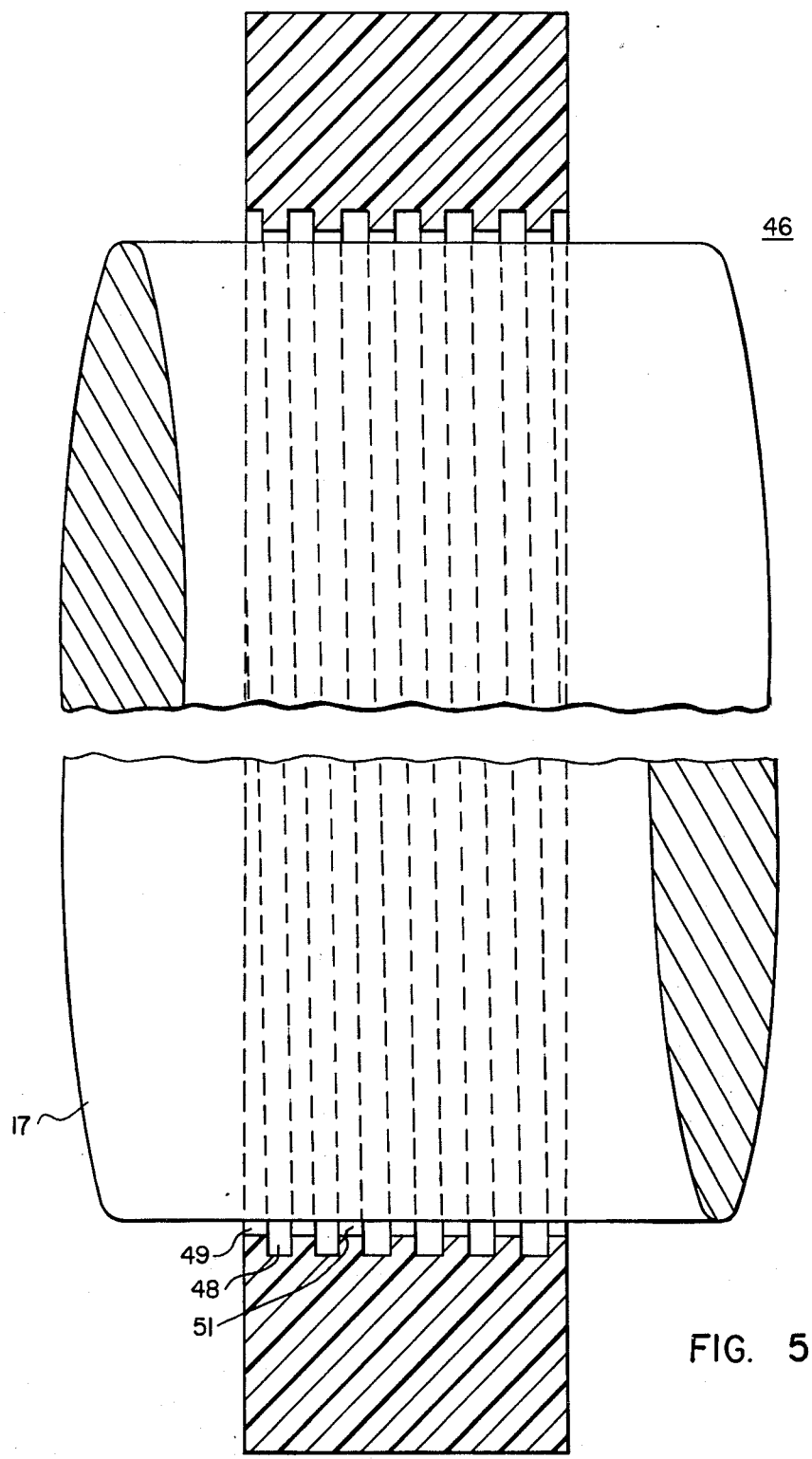
FIG. 5 is a partial sectional view of the grooved visco seal of FIG. 3 in combination with a shaft.

Although the prior art seal arrangement last cited is generally effective over the entire operational speed range of the rotor, further reduction in the amount of water leakage through the gland seal is provided according to the teachings of the present invention in a visco seal structure 46 as illustrated in FIG. 2 of the drawing in which the inside diameter bearing surface 47 of the seal is provided with grooves 48 and lands 49 which extend in a helical relation with respect to the axis 50 of the shaft 17. The annular body portion 46 is spaced apart from the shaft 17 to define an annular passage 51 which is in fluid communication with the grooves 48. Details of the construction of a visco seal structure 46 having a grooved bearing portion is illustrated in FIGS. 3, 4, and 5 of the drawing.

Figure 6:
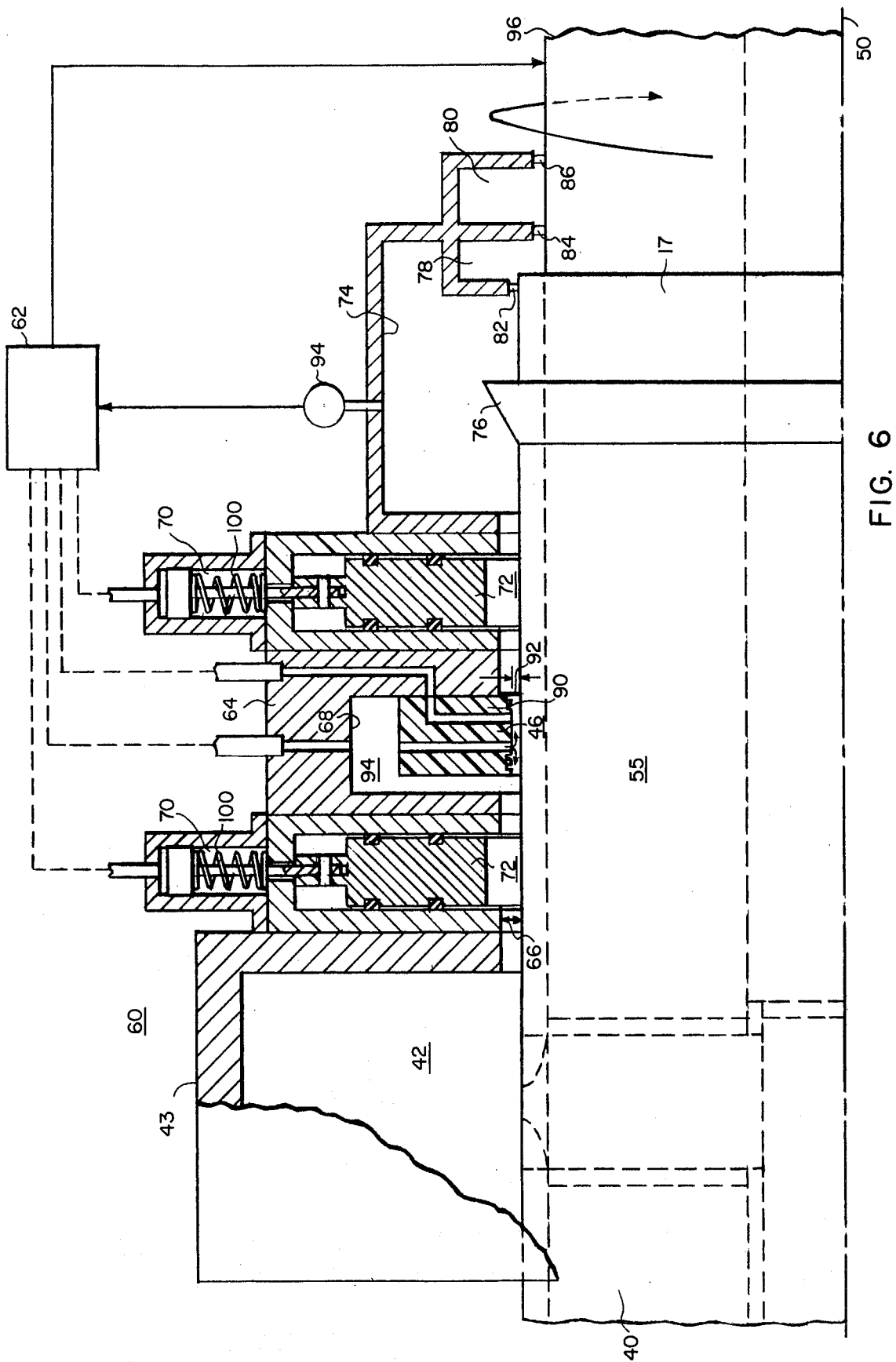
FIG. 6 is an elevation view, in section, of a shaft seal arrangement taught by this invention.

Referring now to FIG. 6, a preferred embodiment of a groove seal is disclosed in combination with a shaft seal arrangement 55 which in combination provides a fluid film visco gland seal generally indicated at reference numeral 46 operable during high velocity operation of the rotor 12, and a contact seal generally indicated at reference 60 operable during low rotational speeds and at standstill. The provision of functionally complementary visco gland seals 46 and contact seals 60 permits the sealing arrangement 55 to provide an effective seal throughout the entire range of operation of the rotor. A suitable control arrangement generally indicated at reference numeral 62 activates and deactivates the contact seal 60 at predetermined rotational speeds of the rotor 12.

The seal arrangement 55, as stated earlier, generally comprises a double flow high speed fluid film seal means 46 for effectively sealing the discharge chamber 42 at speeds within a first specified range, for example from 1800 to 3600 rpm, low speed seal means 60 for effectively sealing the discharge chamber 42 at speeds within a second specified range, for example 0–1800 rpm, and control means 62 for activating and deactivating the low speed seal means 60 when the rotor 12 operates within one of the specified speed ranges. Although a seal arrangement 55 taught by this invention may be disposed from both axial sides of the coolant discharge chamber 42, an arrangement disposed on only one axial side of the discharge chamber 42 is shown.

The seal arrangement 55 is disposed in a seal housing 64 which is disposed axially adjacent to the discharge chamber housing 43. The seal housing 64 is an annular member which surrounds the rotating shaft 17 with a small predetermined clearance 66 and has disposed therein a high speed seal chamber 68. Disposed within the high speed seal chamber 68 is the fluid film visco gland seal generally indicated at 46. Disposed on each axial side of the high speed seal chamber 68 is a low speed chamber 70. Within each low speed seal chamber is a contact seal member generally indicated by reference numeral 72. The high speed seal means 46 efficiently seals the discharge chamber 42 during high rotor operating speed within a predetermined speed range, for example 1800–3600 rpm. Although the low speed seal means 72 is illustrated as being the pair of contact seals 72, any seal device which effectively and efficiently seals the discharge chamber 42 during low rotor operating speeds within a predetermined speed range, for example, 0–1800 rpm, may be used to good advantage.

Axially adjacent to the contact seal chamber 70 is an annular chamber 74. The annular chamber 74 surrounds a thrower 76 which is disposed on the shaft 17. Adjacent the annular chamber 74 is a chamber 78 that is maintained at greater than atmospheric pressure, and also disposed adjacent thereto is an atmospheric chamber 80. Labyrinth seals 82, 84 and 86 are disposed as shown between the chambers 74 and 78, 78 and 80, and the exterior of the seal arrangement housing 55, respectively. According to the teachings of the present invention, the double flow fluid film gland seal 46 disposed in the high speed seal chamber 68 includes a seal ring 90. The seal ring 90 surrounds the shaft 17 with a predetermined small radial clearance 92, which may be on the order of a few mils, and fits snugly into the chamber 68 with the smallest clearance as possible to minimize leakage past the ring 90 in the radial direction. The seal ring 90 is stationary in the chamber 68 and may be held against rotation in any desired manner.

An annular chamber 94 is defined between the seal ring 90 and the interior of the chamber 68. As indicated at reference number 92, the seal ring 90 extends a few mils closer to the surface of the shaft 17 than does the chamber housing 43. This arrangement minimizes possible damage due to inherent and uncontrollable vibrations in the shaft 17. The gland seal ring 90 is free floating within the chamber 68, allowing the seal ring 90 to move radially with vibration of the shaft 17.

As disclosed in the summary of the invention, improved sealing for the discharge chamber 42 is provided in the present invention by constructing helical grooves 48 and lands 49 on the inside diameter bearing surfaces 47 of the seal 46 to establish a pumping action which acts against the flow of leakage cooling water through the seal.

The construction and operation of the contact seals 72 is described in detail in the copending application of J. E. Albaric cited above.

It is to be understood that although the fluid film gland seals described herein is of the double flow type, suitable visco gland seals utilizing the single flow arrangement shown in FIG. 2 and thus completely filled discharge chamber may be utilized in conjunction with contact seals 72, the determination of which gland seal is appropriate being dependent upon economic considerations and capabilities of the water recirculation and oxygen removal systems.

When the rotor slows so that the leakage flow into chamber 42 (as monitored by a gauge 94) begins to increase, the control means 62 initiates operation of the contact seals 72. Of course, another suitable parameter such as a gauge 96, which directly monitors the rotor speed, can be utilized by the control means 62 to initiate the contact seals 72. Whatever the operating parameter chosen, either rotor speed or leakage flow, there may be sizable tolerance without adverse effect on the generator. A wide activation band would only means that slightly more flow will occur before the transition from gland to the contact sealing occurs.

Once the appropriate parameter, either rotor speed as measured by the gauge 96, or leakage flow measured by the gauge 94, reaches a predetermined threshold value, the control means 62 will activate the contact seals 72. During normal operation, the contact seals are in their retracted position within the chambers 70, i.e., not engaged against the rotor shaft. Upon receipt of an activation signal from the control means 62, a spring bias means 100 which may include an electrical solenoid (not shown) exerts a force acting on the contact seals 72.

When the machine is again building up to normal speed from standstill, the contact seals 72 are still engaged. As the critical speed parameter, as recorded by gauge 96, or the flow recorded by gauge 94, reaches a predetermined threshold, a control means 62 will cause the spring bias means 100 to cease exerting radially inward directed force on the contact seal and cause a second bias means (not shown) to exert a radially outward directed force on the contact seal 72, thus permitting this spring 100 to disengage the contact seal from the shaft 17. The control means 62 also reinitiates the flow into the gland seals.

Thus, as the rotor again, reaches normal speed, the more efficient visco gland seal 46 will be reactivated. It is seen that through the control means 62, the most effective seal device — contact seal for low speed standstill, gland seal for high speed operation — are cooperatively associated to maintain the overall leakage of liquid coolant from the discharge chamber at an acceptable level throughout the operating speed range of the rotor, thus lowering costs associated with continued treatment of the circulating liquid.

Figure 7:
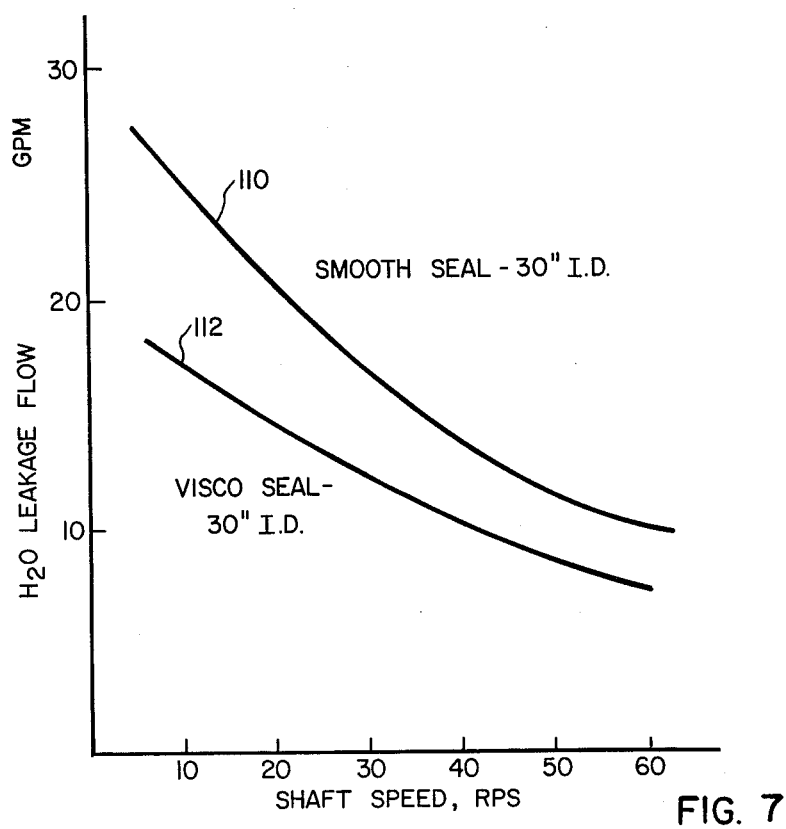
FIG. 7 is a graphical representation of leakage rate plotted against rotor speed for a prior art seal arrangement and for a sealing arrangement embodying the teachings of the present invention.

In comparison of a prior art smooth seal arrangement with the grooved visco seal of the present invention is illustrated in FIG. 7 of the drawing. The curve 110 represents dynamic operation of a typical smooth seal of a conventional design and the curve 112 represents dynamic operation of a grooved visco seal constructed according to the teachings of the present invention. Although the grooved visco seal could theoretically be designed for zero net leakage, in practice it should be designed to allow for a small leakage flow in order to prevent instability. The cooling of the visco seal is taken care of not only by the small net leakage flow on the seal low pressure side but also by a larger flow of coolant water that does enter the seal but is pumped back towards the high pressure side after circulation within the gap. It has been experimentally determined that a grooved visco seal is cooled as well as or better than the comparable "smooth" clearance seal, even though the net leakage flow rate through the grooved seal is smaller. The amount of power utilized to overcome the "drug" is also comparable for smooth and grooved clearance seals of same length, but for a given acceptable leakage, since the corresponding grooved visco seal is shorter than the corresponding smooth seal, the power loss is smaller with the grooved visco seal.

What is claimed is:

1. In a dynamoelectric machine of the type including a rotor and a shaft extending from said rotor, said shaft having a passage for circulation of a liquid cooling fluid therethrough, said passage in said shaft including a discharge passage for discharging said liquid coolant from said shaft and into said discharge chamber, and further including sealing means for sealing said discharge chamber, said sealing means including a first seal device for sealing said discharge chamber during rotation of said shaft in a first speed range corresponding generally from standstill through a first predetermined speed of rotation of said shaft, said first seal device being a contact seal, and a second seal device for sealing said discharge chamber during rotation of said shaft in a second speed range corresponding generally to a speed substantially equal to said first predetermined speed of rotation through a second predetermined speed of rotation greater than said first predetermined speed of rotation, said second seal device comprising a gland seal having an annular body portion disposed about said shaft, said annular body portion being spaced apart from said shaft to define an annular passage, the surface of said annular body portion confronting said shaft having a land portion extending in helical relation with respect to the axis of said shaft, said land portion defining a groove which extends in helical relation with respect to the axis of said shaft and which is in fluid communication with said annular passage, and means for introducing a sealing liquid into said annular passage between the body portion of said second seal device and said shaft.

2. The combination as defined in claim 1 wherein said first speed range is substantially 0–1800 RPM and said second speed range is substantially 1800–3600 RPM.

* * * * *